US012584635B2

(12) United States Patent
Guida et al.

(10) Patent No.: US 12,584,635 B2
(45) Date of Patent: Mar. 24, 2026

(54) METHOD OF OPERATING A COOKING OVEN, IN PARTICULAR A STEAM COOKING OVEN

(71) Applicant: ELECTROLUX APPLIANCES AKTIEBOLAG, Stockholm (SE)

(72) Inventors: Nicola Guida, Forli (IT); Paolo Faraldi, Forli (IT); Milka Bekjarova, Forli (IT); Stefania Bello, Forli (IT); Paolo Piccin, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 259 days.

(21) Appl. No.: 18/086,167

(22) Filed: Dec. 21, 2022

(65) Prior Publication Data

US 2023/0135442 A1      May 4, 2023

Related U.S. Application Data

(63) Continuation of application No. 16/468,725, filed as application No. PCT/EP2017/081070 on Nov. 30, 2017, now abandoned.

(30) Foreign Application Priority Data

Dec. 21, 2016     (EP) ..................................... 16205775

(51) Int. Cl.
*F24C 7/08*          (2006.01)
*A21B 3/04*          (2006.01)
(Continued)

(52) U.S. Cl.
CPC ................ *F24C 7/085* (2013.01); *A21B 3/04* (2013.01); *F24C 3/128* (2013.01); *F24C 15/327* (2013.01); *G05D 23/1951* (2013.01)

(58) Field of Classification Search
CPC ........ A21B 3/04; F24C 15/327; F24C 15/085; G05D 23/1951
See application file for complete search history.

(56) References Cited

U.S. PATENT DOCUMENTS 4,924,072 A        5/1990  Oslin
10,123,556 B2 *  11/2018  Distaso .................... A21B 1/14
(Continued)

FOREIGN PATENT DOCUMENTS

EP          2048566 A2     4/2009
EP          2123981 A1     11/2009
(Continued)

OTHER PUBLICATIONS

International Search Report and Written Opinion in PCT/EP2017/081070 dated Apr. 13, 2018 (14 pages).

*Primary Examiner* — Steven N Leff
(74) *Attorney, Agent, or Firm* — Chrisman Gallo Tochtrop LLC

(57)          ABSTRACT

The present invention in particular relates to a method of operating a cooking oven, comprising:
  receiving a manual user setting for one or more than one primary cooking parameters; and,
  upon receipt of the one or more primary cooking parameters, executing an algorithm function for automatically and without further user input setting one or more than one additional secondary cooking parameters different from the received one or more primary cooking parameter
  the execution of the algorithm function comprising:
    accessing an electronic database (4, 7), the electronic database (4, 7) including a mapping between the e primary and secondary cooking parameters; and
(Continued)

by automatically and without user input setting the secondary cooking parameters for controlling the cooking process.

23 Claims, 2 Drawing Sheets

(51) Int. Cl.
*F24C 3/12* (2006.01)
*F24C 15/32* (2006.01)
*G05D 23/19* (2006.01)

(56) References Cited

U.S. PATENT DOCUMENTS

| | | | |
|---|---|---|---|
| 2004/0261632 A1* | 12/2004 | Hansen | F24C 15/327 |
| | | | 99/468 |
| 2008/0095905 A1* | 4/2008 | Sells | F24C 15/327 |
| | | | 426/510 |
| 2012/0107460 A1* | 5/2012 | Lubrina | F24C 7/08 |
| | | | 426/231 |
| 2012/0294992 A1 | 11/2012 | Sager | |

FOREIGN PATENT DOCUMENTS

| | | | |
|---|---|---|---|
| EP | 2189724 A1 | 5/2010 |
| WO | 2012162072 A1 | 11/2012 |
| WO | 2015043648 A1 | 4/2015 |

* cited by examiner

METHOD OF OPERATING A COOKING OVEN, IN PARTICULAR A STEAM COOKING OVEN

This application is a continuation of U.S. Ser. No. 16/468,725 filed on Jun. 12, 2019, which is a US National Phase application of PCT/EP2017/081070 filed on Nov. 30, 2017, which claims the benefit of EP Application No. 16205775.6 filed on Dec. 21, 2016. These applications are incorporated herein by reference.

The present invention relates to methods of operating a cooking oven, in particular a steam cooking oven, and specifically to methods for setting cooking parameters for operating a cooking oven, in particular steam cooking oven. Further, the present invention relates to a cooking oven, in particular a steam cooking oven having a steam cooking function.

With cooking ovens, integrated cooking functions, such as for example steam cooking functions, become more and more significant or popular. Further, there is an increasing demand in cooking ovens and corresponding devices, to provide particular cooking functions or functionalities, for example cooking functions enabling steam cooking and others. Cooking ovens suitable for steam cooking may for example comprise a steam generator in addition to, e.g. conventional, heating elements, wherein setting up a steam cooking process may require adjusting or setting the temperature and humidity. Integrated cooking functions, such as for example a steam cooking function, may provide additional opportunities or particular advantages with respect to food quality, e.g. the nutritive value, as compared to conventional cooking.

The present invention resides in the field controlling cooking ovens enabling different cooking modalities, such as for example steam cooking and others. An object of the invention may be considered as providing new, improved or alternative ways of operating a cooking oven, e.g. a steam cooking oven, in particular new, improved or alternative ways for setting cooking parameters for operating cooking devices, e.g. cooking ovens, in connection with setting cooking parameters for performing a particular cooking process, in particular an integrated cooking process, such as for example a steam cooking process.

The underlying invention in particular is based on the finding that human-machine interaction and user guidance in the field of cooking appliances allowing operating a respective cooking oven in accordance with one or more integrated cooking processes, such as for example a steam cooking process in a steam cooking appliance, or a non-steam-cooking process, may be necessary in order to set up respective cooking processes. Further, the invention is based on the finding that improved food treatment resulting in improved food quality in connection with integrated cooking processes may, for example with respect to operating and conducting steam cooking processes, may be obtained by providing, on a technical level of device operation, improved human-machine interaction and user guidance, e.g. in the field of setting and/or defining operational cooking parameters.

Further, the underlying invention is based on the finding that the operation of cooking ovens enabling execution of integrated cooking processes, such as steam cooking processes in a steam cooking oven or similar appliance, requires particular knowledge for performing a corresponding cooking process in order to obtain suitable and desired cooking results and food qualities.

An integrated cooking process in particular may be understood as including one or more processes or process steps going beyond the process of merely heating up food. An integrated cooking process may for example include treating food under a particular temperature and humidity regime, e.g. in a steam cooking process.

As an example, appropriately setting up a steam cooking process may involve the following steps before the steam cooking process may be started:
turning on the cooking oven,
    activating a steam cooking function,
    setting a cooking temperature for the oven cavity,
    setting a humidity amount for the oven cavity, and
    optionally setting a time period for the cooking process,
        for example a steam cooking portion of the cooking process.

For example, steam cooking processes may require to set the two parameters "cooking temperature" and "humidity amount" for the oven cavity. These, and the above-identified parameters, as well as other parameters, such as steam cooking time, fan operation, fan power level, etc. may interdepend, and it may therefore be comparatively challenging for a user to set all necessary parameters appropriately in order to obtain the desired, or in other words an optimal, steam cooking result and food quality.

It has been found, that there may exist situations in which a user who wants to conduct for example a steam cooking process, even if familiar with all the parameters to be set and their interdependency, may not be able to set or adjust all parameters such that an optimal cooking result and final optimal food quality can be guaranteed. It is one of the findings of the invention that this is a crucial point for obtaining user acceptance and establishing cooking processes suitable for obtaining high quality cooking results, e.g. in steam cooking processes. The invention is further based on the finding that users typically have at least some experience in setting cooking temperatures.

In view of these findings, the invention aims at providing improvements in cooking processes, such as steam cooking processes and non-steam cooking processes, such that improved, in particular optimal cooking results may be obtained, by performing the cooking process, e.g. a steam cooking process. Further, appropriate user guidance and human-machine interaction in connection with setting operational cooking parameters shall be provided, to be enable users not having special knowledge about parameter settings in respective cooking processes, e.g. steam cooking process, to set up and carry out respective cooking processes.

According to the present invention a computer-implemented method of operating a cooking oven, in particular a method of setting cooking parameters for operating a cooking oven, i.e. for performing a cooking process, such as a steam cooking process, is provided.

In accordance with embodiments of the invention, a computer-implemented method of setting cooking parameters for operating a cooking oven for performing a cooking process, such as for example a steam cooking process, may be provided. The cooking process may for example be performed in an oven cavity of the cooking oven. The method according to the embodiment may comprise the following steps:
    receiving, at the cooking oven, a manual user setting for one or more than one primary cooking parameters for performing a cooking process for cooking food items with the cooking oven, the primary cooking parameter selected from the group comprising a cooking temperature, a cooking temperature range, a cooking time, and one or more than one food-related cooking parameters; and upon receipt of the one or more primary cooking parameters, executing, by a control unit of the cooking oven, an algorithm function for automatically and without further user input setting (in particular: adjusting) one or more than one additional secondary cooking parameters, wherein the one or more than one secondary cooking parameter that is different from the received one or more primary cooking parameter and provides additional operational settings for performing the cooking process on the basis of the received one or more primary cooking parameter.

With this embodiment, the execution of the algorithm function may comprise the steps of:

accessing an electronic database, the electronic database including a, in particular predefined, mapping (in particular: relationship, or correspondence) between the one or more than one primary cooking parameter on the one hand, and the additional one or more than one additional secondary cooking parameters on the other hand; and by the control unit automatically and without user input, selecting and setting (in particular: identifying) the one or more than one additional secondary cooking parameters for controlling the cooking process, based on the one or more than one received primary cooking parameters and the mapping provided by the electronic database.

The one or more primary cooking parameter(s) may correspond to operational parameters to be used as main reference or target parameters defining the cooking process. The one or more secondary operational parameter(s) may correspond to one or more operational parameter(s) to be selected or set in dependence on or as a function of the one or more primary cooking parameter(s).

As an example, in a steam cooking process, the operational parameter "temperature" may be selected as the primary cooking parameter, and the operational parameter "humidity level" may be selected as the additional secondary operational parameter.

The proposed method may provide a possibility of defining, from a group of pre-defined operational parameters, one or more than one parameter to be used as primary cooking parameter. As an example, in case that the temperature is selected as the primary parameter, the humidity level in a steam cooking process may be automatically set as the secondary parameter. On the other hand, if the humidity level is selected as the primary cooking parameter, the temperature and others may be set as the secondary parameter. Thus, operation of the device, in particular user-guidance, may be adapted to the operator's knowledge.

In further embodiments, the method may involve an operational mode in which the operational parameters, e.g. the primary and/or secondary operational parameters, are ranked according to a pre-defined ranking. For example, the operational parameter "temperature" may be defined as the highest-ranking operational parameter, and the operational parameter "time" may be defined as a lower ranking operational parameter. The ranking may for example be defined such that, at least in part, the higher the degrees of freedom for setting other operational parameters, the lower the ranking of the operational parameter. Or in other words, the lower the degree of freedom for setting other, in particular secondary, operational parameters, the higher the ranking of an operation parameter.

In embodiments, the method may enable the operator, i.e. user, to set, at least in part, two or more, i.e. several, operational parameters of descending, in particular successive, levels within the ranking, and, upon receiving a corresponding user input, the control unit may automatically set other operational parameters based on the received settings. User guidance in particular may be provided by providing the operator or user with a selection range based on the parameter setting received for a higher-ranking operational parameter. By this, adequate user guidance for obtaining an optimal set of operational parameters for performing a cooking process may be obtained.

In embodiments, the type of database or database entry for setting the operational parameters of the secondary parameters may be selected based on the type and/or number of primary cooking parameters. In particular, the database and, in particular the database complexity, may be selected based on the type and/or number of parameters received by the user.

The database may be stored in a memory of the cooking oven, or may, at least in part be represented by an external data source accessible by the cooking device via a wireless or wire-based network connection. In particular, in case of providing one or more database to be stored in a storage unit of the cooking appliance, the appliance may be comprise an update functionality enabling updates of the database from a remote data source, e.g. a data source of the manufacturer or other third party data provider.

The database may comprise an integrated, unique database where more than one of the operational parameters may be selected as the highest-ranking operational parameter.

The database may comprise parameter settings for multiple cooking phases, wherein receiving a user input including one or more of the primary parameters may cause the control unit of the oven to set cooking and operational parameters related to several, in particular all, subsequent cooking phases, and, for example related loads of heating elements, fans, steaming units, etc.

In embodiments, the electronic database may comprise at least one lookup table that may include one or more mappings (in particular: relationships), such as for example unequivocal mappings, between one or more than one primary cooking parameter and one or more than one secondary cooking parameter. The database may include at least one index, with one or more index entries including pointers associating one or more of the secondary operational parameters with selectable primary cooking parameters. A respective database may also comprise one or more reverse indices associating secondary operational parameters with primary cooking parameters.

In embodiments, the mappings (in particular: relationships) between the primary and secondary operational parameters may include a mappings between one or more than one secondary cooking parameter defining one or more humidity levels and one or more primary cooking parameters defining cooking temperatures, in particular steam cooking temperatures, temperature ranges, in particular steam cooking temperature ranges, a cooking time and/or a food-related cooking parameter to be received as the one or more than one primary cooking parameter by manual user setting.

In particular embodiments related to steam cooking ovens and corresponding steam cooking processes, the database may include a number of predetermined cooking temperature ranges as primary cooking parameters, wherein each cooking temperature range in the database may corresponds to one particular, i.e. pre-determined, humidity amount or humidity level.

In embodiments, the one or more primary cooking parameters may comprise a food-related cooking parameter, in particular a cooking parameter that may be food-specific, e.g. specific for the particular food item or combination of food items to be treated during a cooking process. Such a food-related cooking parameter may for example be related to food weight, food volume, initial food temperature, initial food consistency, such as frozen, thawed, semi-thawed and the like, and food finishing related for example to the final condition of a food item and/or its surface, for example like roasted, grilled, medium, well-done etc.

In embodiments, the cooking process may comprising at least one first and at least one subsequent second cooking phase, wherein at least one of the one or more than one primary and/or secondary cooking parameters is associated with the first cooking phase and/or second cooking phase. In particular, embodiments, the primary parameters may be related to the first cooking phase, and cooking parameters related to the second cooking phase may at least in part be handled as secondary cooking parameters automatically set by the controlling unit. In embodiments one or more operational parameters of the second cooking phase may be selectable and set as primary cooking parameters, wherein further operational parameters of the second cooking phase, and optionally of subsequent cooking phases, may be set in accordance with such a primary cooking parameter, i.e. primary operational parameter based on one or more database entries of the accessed electronic database.

In embodiments, at least one of the one or more than one secondary cooking parameters is associated with an operational setting of one or more heating elements, one or more fans, one or more humidifier units, one or more timers, respectively intended for controlling a current and/or subsequent cooking phase.

In embodiments, the cooking process may involve as an operational primary cooking parameter a steam cooking time period, wherein the method may comprise the steps of:
  receiving as an operational primary cooking parameter a user input setting the steam cooking time period, and
  using the received operational primary cooking parameter setting the cooking time period as an operational parameter for controlling the stop time of the cooking process, in particular steam cooking process.

In embodiments, the cooking process may be a steam cooking process, and the database may include a number of predetermined steam cooking time periods for steam cooking processes. Each time period may be assigned to a steam cooking temperature or steam cooking temperature range, and a steam cooking humidity level. The algorithm function in such embodiments may be configured to set, based on a received steam cooking temperature or temperature level and/or time period as the primary cooking parameter, the steam cooking humidity level and optionally further primary cooking parameters not received as user setting.

In embodiments, the control unit may be operable to prompt or query the user, after a first input of a setting for a primary operational parameter, i.e. cooking parameter, to enter a setting for a further primary operational parameter, i.e. cooking parameter. In case that the user enters such a further primary cooking parameter, the control unit may set the secondary cooking parameters based on the entered plurality of primary cooking parameters.

In other variants, the user may be provided with a possibility to cancel entry of further primary cooking parameters, and, in response to receiving a corresponding user input indicating that the user has completed entering settings for primary cooking parameters, the control unit may, in response to such a user input, be operable to determine settings for additional secondary operational parameters based on the settings for the primary cooking parameters that had previously been received via corresponding user inputs.

In embodiments, the database may include a number of kinds of food, wherein each kind of food may be assigned to a particular combination of at least one primary cooking parameter to be set by the user and at least one secondary cooking parameter to be set (in particular: identified) by the algorithm function.

The database may comprise at least one dataset comprising a mapping between one or more cooking temperatures or cooking temperature ranges, in particular steam cooking temperatures or steam cooking temperature ranges, as the primary cooking parameter, and one or more than one steam cooking humidity levels or steam cooking humidity ranges, as the secondary cooking parameters.

As can be seen, the proposed method is suitable for obtaining enhanced user guidance in connection with setting operational parameters for operating cooking appliances, in particular steam cooking appliances.

For performing a steam cooking process in an oven cavity of the cooking oven is provided, wherein the method comprises the steps of:
  manually setting a cooking temperature or a cooking temperature range for the oven cavity by a user, and
  automatically setting or adjusting a humidity amount level for the steam cooking process on the basis of the set cooking temperature or cooking temperature range, respectively, by accessing an electronic database, wherein
  the database including a relationship between steam cooking humidity amount levels on the one hand and steam cooking temperatures or steam cooking temperature ranges on the other hand.

Specifically, a controller or user interface of the cooking oven may receive a steam cooking temperature setting from a user. The steam cooking temperature setting may be used by the controller for automatically determining and setting a steam cooking humidity level for the steam cooking process. Determining the steam cooking humidity setting may involve, by a controller of the cooking oven, using, i.e. accessing, an electronic database, i.e. data source, accessible by the controller. The data source may include, e.g. store, a one or more, in particular a plurality, of relationships between steam cooking temperatures and steam cooking humidity levels, involving for example one or more indices.

The data source may be stored in a memory of the cooking device accessible by the controller, or may be otherwise accessible, for example over a wire-bound or wireless data communication network connected or connectable with the controller and/or the cooking oven or appliance.

The electronic database or data source may in embodiments comprise one or more, in particular one, lookup table including, i.e. storing, a relationship, i.e. one or more relationships, between steam cooking humidity amount levels and steam cooking temperature settings or steam cooking temperature range settings.

The database, in particular the lookup table, may comprise a plurality of steam cooking temperature settings or steam cooking temperature range settings or steam cooking temperature ranges, and a plurality of steam cooking humidity amount levels, wherein each temperature setting, temperature range setting, and/or each temperature range may be assigned, associated or matched with a particular steam humidity level.

Upon receiving the steam cooking temperature setting, the controller may for example access the lookup table by comparing the received temperature setting with the temperature settings or temperature ranges in the lookup table, and may then identify the steam humidity level assigned to the received temperature setting. The identified steam humidity level may then be used and applied by the controller as steam humidity setting to be used for carrying out the steam cooking process.

The present invention in particular enables automatically adjusting the humidity amount on the basis of a cooking temperature setting or cooking temperature range setting received from the user, thereby greatly simplifying human-machine interactions and user guidance involved in setting up steam cooking processes with cooking ovens suitable for steam cooking. In particular, the proposed method makes it possible for the user to easily set up a steam cooking process by just setting the desired temperature, without being obliged to set the steam cooking humidity level or amount.

In embodiments, the steam cooking humidity level set or determined by the controller is automatically applied as an operational setting used for conducting the steam cooking process.

The controller may, after having determined a suitable humidity level by accessing the database, automatically start or initialize a corresponding steam cooking process in which the temperature setting as received by the user and the humidity level as determined by the controller are applied as operational parameters.

In embodiments, the controller may be operable to enable, prior to starting the steam cooking process, adjusting the humidity level, for example by means of a corresponding user input, wherein the adjusted humidity level following the user input may then be used for carrying out the steam cooking process.

In embodiments, controller may be configured to start the steam cooking process upon receiving a corresponding input, e.g. via a corresponding user interface, from the user. This means, that the steam cooking process may be manually activated or activatable by the user. As mentioned, the controller may also be configured for automatically starting or initializing steam cooking upon receiving the temperature setting, and a corresponding confirmation.

In embodiments, the database, in particular the lookup table, may include a number of predetermined cooking temperature ranges, wherein each cooking temperature range may correspond to one particular humidity amount.

The humidity amount or level may decrease with increasing cooking temperature and/or cooking temperature range, respectively.

Further, the steam cooking process may involve as an operational parameter a steam cooking time period, wherein the method may involve receiving, by the controller or a user interface for example, a user input setting the steam cooking time period, and using the user input setting of the cooking time period as an operational parameter for controlling the end of the cooking time of the steam cooking process. In other words, the controller may be configured such that the steam cooking time may be manually set by the user.

In embodiments, the database, in particular the lookup table, may include a number of predetermined steam cooking time periods for steam cooking processes, wherein each time period is assigned to a steam cooking temperature or steam cooking temperature range, and a steam cooking humidity level or amount. The operational parameters related to steam cooking humidity level and steam cooking time period respectively assigned to a particular steam cooking temperature may be stored in the database, in particular lookup table, in the form of 3-dimensional or higher dimensional vectors, which may facilitate and speed up automatic operational settings upon receiving the temperature setting from the user.

In embodiments, the database, in particular the lookup table, may include a number of kinds of food, wherein each kind of food may be assigned to particular combinations of steam cooking temperatures or steam cooking temperature ranges, and steam cooking humidity levels or amounts. The kind of food may be used as a further cooking parameter, for example selectable via a user interface by the user, wherein the kind of food may be part of a vector component of a 3-dimensional vector involving cooking temperature, humidity level, and kind of food, or a 4-dimensional or higher dimensional vector involving cooking temperature, humidity level, cooking time, and kind of food.

The controller may be configured and operable to receive a user input specifying a particular kind or type of food, for example via a selection on a user interface. The controller may then operate to select amongst the parameter sets stored in the database only those datasets, e.g. a subgroup of all stored data sets, corresponding to the received food type selection. Amongst the subgroup of data sets, the controller may then determine, by comparing for example the temperature setting received from the user against the subgroup of datasets, corresponding steam cooking humidity levels and/or steam cooking time durations.

According to a further object of the present invention a cooking oven, in particular a steam cooking oven, with at least one cooking function, in particular steam cooking function, suitable for performing one or more cooking processes, is provided.

The cooking oven may comprise at least one control unit for controlling the at least one cooking process, wherein the control unit may be configured for carrying out all the steps of a method according to an embodiment of the underlying invention as described herein.

In particular, the control unit may be adapted to receive, for example via a corresponding user interface, a manual user setting for one or more than one primary cooking parameters for cooking food items with the cooking oven.

The primary cooking parameter may be selected from the group comprising at least one of a steam cooking temperature, a steam cooking temperature range, a cooking time, and one or more than one food-related cooking parameters.

The control unit may further be adapted to or configured for automatically, and without further user input setting (in particular: adjusting) one or more than one additional secondary cooking for the cooking process on the basis of the received manual user setting. The one or more secondary cooking parameters may be different from the one or more primary cooking parameters for which the user may enter user settings. The secondary cooking parameter may for example comprise a steam cooking humidity level corresponding, for example, to a particular steam cooking temperature or temperature range.

The cooking oven may comprise or have access to an associated electronic database, in particular comprising a lookup table. The database may be implemented within and/or may otherwise be electronically accessible by the control unit. The electronic database may include a plurality of datasets, wherein each dataset comprises at least one mapping (in particular: relationship) between a primary cooking parameter, i.e. a primary operational parameter, on the one hand and a secondary cooking parameter, i.e. a secondary operational parameter, on the other hand. The mapping in particular may be implemented in the database such that a combination of the primary cooking parameter set by the user and the mapped secondary operational parameter accomplish or represent an executable combination of operational parameters for executing a cooking process, in particular a steam cooking process with the aim of obtaining a particular cooking result.

With the proposed cooking oven, the control unit is adapted and set up for executing an algorithm function, the executing of the algorithm function comprising:

accessing the electronic database in response to receiving one or more than one primary cooking parameter settings by a user; and setting (in particular: identifying), based on the received one or more than one primary cooking parameters, the one or more than one secondary cooking parameters for controlling the cooking process, wherein the one or more than one secondary cooking parameter are identified based on the received setting for the primary cooking parameter and the mapping as defined in the electronic database.

In embodiments of the cooking oven, the one or more than one secondary cooking parameters comprise at least one steam cooking humidity level, wherein the control unit is configured to set the at least one steam cooking humidity level based on a received manual setting of a steam cooking temperature, a steam cooking temperature range, and/or a cooking time, and based on a corresponding mapping as defined in the electronic database.

In general, the secondary operational parameter may be determined or generated by accessing the electronic database with the one or more primary parameters as input parameters, and, based on the input parameter, retrieving from the electronic database secondary operational parameters mapped in the database to the primary cooking parameters.

In embodiments, the control unit may be adapted and set up for activating a steam cooking process responsive to receiving as a manual setting by a user one or more than one of the primary cooking parameters, wherein one or more than one of the secondary cooking parameters is set by the control unit as a steam cooking humidity level by accessing a database entry in the electronic database, the database entry corresponding to the received manual setting.

In embodiments, the database may include a number of datasets, each dataset including a cooking temperature or cooking temperature range, and/or cooking time as one or more primary cooking parameters, and one or more assigned particular humidity levels as corresponding secondary operational parameters corresponding to one or more than one operational phases of a steam cooking process.

In embodiments, the control unit may comprise a memory device storing instructions which, when executed by the control unit, cause the cooking oven to execute a method comprising all the steps of a method according to at least one embodiment of the invention as described herein.

In embodiments, a computer readable non-volatile storage medium may be provided, storage medium storing instructions configured for carrying out, when executed by a computing device, a method comprising all the steps of a method according to at least one embodiment of the invention as described herein.

In embodiments, a corresponding algorithm for operating may be included in the oven software of for example the user interface.

In particular in connection with steam cooking operational modes, a set parameter input of the customer, operator or user, the database may be or represent the basis for operating a predefined number, e.g. 4 (four), of different cooking function modalities in a pre-defined number of temperature sectors, e.g. 4 (four) temperature sectors, in particular to create, e.g. in corresponding sectors, different amounts of humidity. Such operational modes in particular are possible, because the temperature setting received by the user, or in more general terms the received primary parameter, may be used to drive the heating elements and, by accessing the electronic database, e.g. the lookup table, the steam generating unit in order to get the right humidity setting in accordance with the database.

As can be seen, it is sufficient that the user enters a basic parameter, whereas more involved parameters for proper operation may be set by the device to avoid any mistakes and to avoid poor cooking results.

The cooking oven, in particular steam cooking oven, may in embodiments be provided with steam cooking functions, i.e. the oven may be implemented to be operable in steam cooking mode, wherein the cooking oven may include at least one controller or control unit implemented and set up for controlling a steam cooking process, the control unit may be adapted for receiving a manual setting of a steam cooking temperature or a steam cooking temperature range for the oven cavity by a user, an electronically accessible database, in particular lookup table, is implemented within the control unit or accessible by the control unit, the database, in particular the lookup table, may include a plurality of datasets, each dataset comprising at least one mapping (in particular: relationship) between a steam cooking temperature or steam cooking temperature range on the one hand, and a steam cooking humidity level on the other hand, and the control unit may be adapted and set up for an automatically setting or adjusting the steam cooking humidity level on the basis of the manual setting of the steam cooking temperature or cooking temperature range, respectively, by using the database.

It shall be noted that it is also possible that the humidity level is used as the user-set primary cooking parameter, and that the respective secondary operational parameter is the temperature to be determined based on accessing a corresponding entrance or mapping in the lookup table.

In embodiments, the controller or user interface may provide an operational mode in which the user is allowed to select (in particular: define) the type and number of primary cooking parameters. The other operational parameters may be set as secondary operational parameters to be determined based on an electronic database or knowledge source accessible by the controller or cooling oven. In embodiments, an operational mode may be provided in which the number and type of secondary operational parameters may be selected (in particular: defined) by the user. Such operational modes in particular require that corresponding mappings between primary and secondary operational modes are available in the electronic database, in particular electronic knowledge base or knowledge source.

Automatically setting the steam cooking humidity level, or more general secondary operational parameters, may involve comparing the manual setting of the steam cooking temperature, in more general terms the primary cooking parameter, against the datasets stored in the database, and upon finding a match for the input primary cooking parameter, the matching secondary operational parameter may be retrieved and set as an active operational parameter for conducting a subsequent cooking process, e.g. steam cooking process.

A steam-cooking oven configured according to the present invention may be set up for automatically adjusting the steam cooking humidity level or amount, i.e. the humidity level prevailing within a cooking chamber during steam cooking, based on a user-set steam cooking temperature or steam cooking temperature range, respectively. In particular, the user is not required to adjust or set the humidity level, which might lead to undesired cooking results.

The control unit may be adapted and set up for receiving a manual activation input from a user, e.g. via a user interface or similar control units, for example mobile control units, for activating a cooking process, in particular steam cooking process, after inputting the primary parameter or parameters.

In embodiments, the database, in particular the lookup table, may include a number of predetermined steam cooking temperature ranges, wherein each steam cooking temperature range may correspond or be assigned to one particular humidity level.

In embodiments, the controller or control unit may be adapted for receiving a manual user input setting the time period or time duration, in particular an upper time limit, for a steam cooking process.

In embodiments, the database, in particular lookup table, may include a number of predetermined steam cooking time periods for steam cooking processes, wherein each time period in combination with a steam cooking temperature or steam cooking temperature range, respectively, corresponds to one particular humidity level.

In embodiments, the database, in particular lookup table, may include a number of kinds of food, wherein each kind of food in combination a primary cooking parameter, e.g. a steam cooking temperature or steam cooking temperature range, respectively, may correspond to one particular secondary operational parameter, e.g. a steam cooking humidity amount. This in particular may ease setting up cooking processes, e.g. steam cooking processes, and may facilitate user guidance and support in operating and setting up cooking, in particular steam-cooking, processes.

In embodiments, a computer program product may be provided the computer program product comprising instructions stored on a computer readable non-volatile medium, the instructions configured for carrying out, when executed by a computing device, a method comprising all the steps of a method according to any embodiment according to the invention as described herein.

Novel and inventive features of the present invention are set forth, in particular, in the appended claims.

Exemplary embodiments of the present invention will now be described with reference to the drawings, in which FIG. 1 illustrates a symbolic representation of a kind of user interface or user guidance for setting up a steam cooking process;

Figure 2:
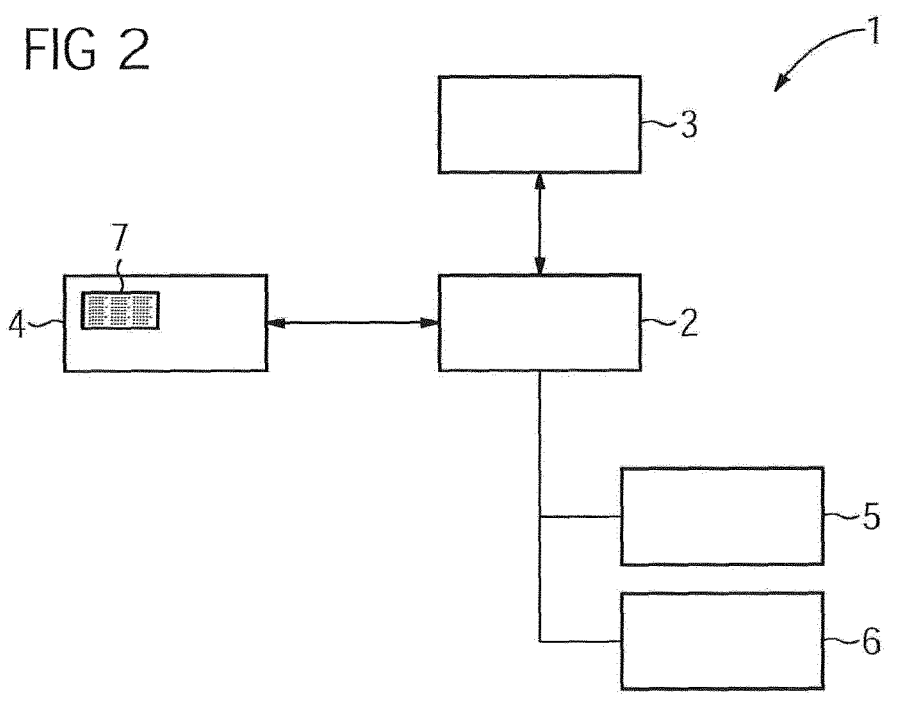
FIG. 2 illustrates a schematic system overview of an operational system for controlling a steam cooking process according to an embodiment of the invention.

FIG. 2 illustrates a schematic system overview of an operational system 1 for controlling a steam cooking process according to an embodiment of the invention. It shall be noted that the principles resulting from the exemplary operational mode in connection with a steam cooking process shall also apply more generally for any type of cooking process in which a primary cooking parameter, i.e. a primary cooking parameter, such as for example the steam cooking temperature, and a secondary operational parameter, such as for example the steam cooking humidity level, are required for setting up a cooking process.

The operational system 1 comprises a controller 2 that is configured and set up for controlling a steam cooking process of a steam cooking oven (not shown), for example. The controller 2 is coupled for data exchange and transmission with a user interface 3 and a memory 4. The controller 2 is also coupled with operational components of the steam-cooking oven, in particular one or more heat generators 5 and a steam generator 6.

Figure 1:
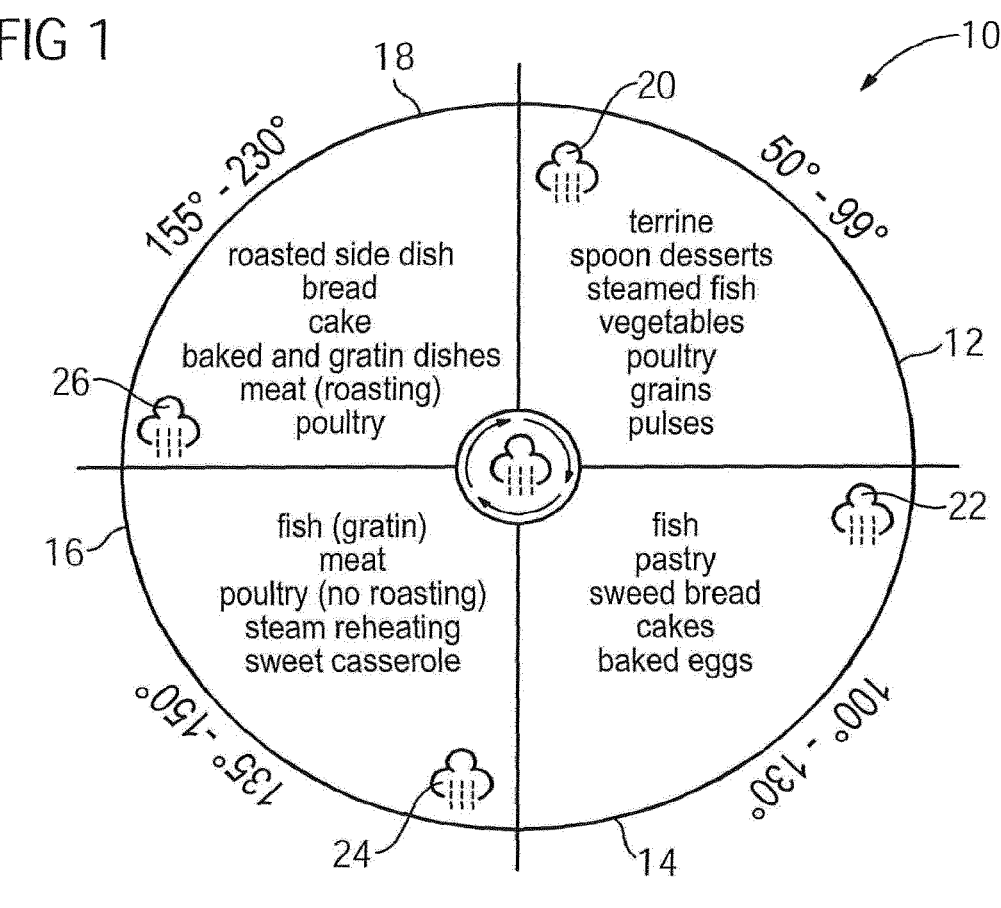
FIG. 1 illustrates a symbolic representation of a kind of user control interface 10 related to setting up a steam cooking process with a steam cooking oven. The steam cooking process may be carried out in an oven cavity of a cooking oven, for example.

The user control interface 10 in FIG. 1 is exemplarily represented by a circle subdivided into four sectors. Each sector circle corresponds to a particular cooking temperature range 12, 14, 16 and 18 of assigned to a particular steam cooking process, respectively. The user control interface 10 may be provided on the steam-cooking oven for user access, e.g. the user control interface 10, or a similar representation may be displayed on in or on the user interface 3.

In the example shown in FIG. 1, a first cooking temperature range 12 that is provided for selection by the user extends from 50° C. to 90° C., a second cooking temperature range 14 extends from 100° C. to 130° C., a third cooking temperature range 16 extends from 135° C. to 150° C. 16 and a fourth cooking temperature range 18 extends from 155° C. to 230° C.

For example, the first cooking temperature range 12 is suitable for cooking of terrine, spoon desserts, steamed fish, vegetables, poultry, grains and/or pulses. The second cooking temperature range 14 may be used for cooking fish, pastry, sweet bread, cakes and/or baked eggs. For example, the third cooking temperature range 16 is suitable for cooking sweet casserole, gratin fish, meat and/or poultry, which is not roasted. Further, the third cooking temperature range 16 may be used for steam reheating. At last, the fourth cooking temperature range 18 is suitable for roasted side dish, bread, cake, baked and gratin dishes, roasted meat and/or poultry. The mentioned kind of foods suitable for use with corresponding steam cooking processes are merely illustrative.

In embodiments, the user interface 3, which may be adapted to display to the user control interface 10 or another suitable representation thereof, may be operative to present to the user a search functionality in which the controller may be adapted to receive from the user via the user interface 3 a search query comprising a particular kind of food, wherein the controller may then carry out a query by accessing a database, for example stored in the memory 4, for identifying suitable steam cooking processes, wherein the identified cooking processes may then be provided for display to the user on the user interface 3. However, providing a selected number of types of food within the user control interface as shown in FIG. 1 may be suitable and adequate for user guidance and for facilitating human-machine interaction when the user is setting up a steam cooking process.

In the user control interface 10, each cooking temperature range 12, 14, 16 and 18 corresponds with a predetermined humidity level 20, 22, 24 and 26, respectively, represented in the present case by a specific steam symbol.

In the given exemplary embodiment, the first cooking temperature range 12 corresponds to a predetermined first humidity level 20. In a similar way, the second cooking temperature range 14 corresponds to a predetermined second humidity amount 22, the third cooking temperature range 16 corresponds to a predetermined third humidity amount 24, and the fourth cooking temperature range 18 corresponds to a predetermined fourth humidity amount 26. The first humidity amount 20 correlates with the highest humidity level that may be generated by the steam generator 6, while the fourth humidity level 26 correlates with the lowest humidity level.

The controller 2 is configured and set up for carrying out a steam cooking process based on receiving a temperature selection or temperature input from the user operating the user control interface 10.

Upon receiving a particular temperature range setting, e.g. 12, 14, 16, or 18, the controller accesses an electronic database stored in memory 4 or implemented in software executed by the controller 2. The database may for example be implemented as a lookup table 7, which is schematically depicted in FIG. 2 as being stored in memory 4.

Based on the received temperature range setting, which in embodiments may merely be related to a particular temperature value, the controller may access the lookup table 7 storing valid relationships between steam cooking temperature ranges or steam cooking temperatures and humidity levels. By accessing the lookup table 7 the controller 2 may extract the humidity level assigned to the selected steam cooking temperature range or temperature, and the controller 2 may then use the extracted humidity level as operational parameter for carrying out a subsequent steam cooking process involving the received steam cooking temperature selected by the user.

As can be seen, the proposed method and controller 2 allow an automatic setting of the humidity level, as a secondary operational parameter, for carrying out a steam cooking process, in an oven cavity for example, wherein only the steam cooking temperature or temperature range, as a primary cooking parameter, is required to be received as a user input.

In embodiments, if the controller 2 receives, for example via the user interface 3, an activation signal for a steam cooking function, and receives steam cooking temperature setting via the user interface 3, for example, then the controller automatically sets the humidity level in accordance to the set steam cooking temperature range or steam cooking temperature. It is not necessary for the user to set the steam cooking humidity level by himself. Therefore advantageous user guidance and improvements in human-machine interaction may be obtained, to thereby provide the user with operational modes suitable for obtaining appropriate cooking results.

The controller 2 may be configured for either starting a steam cooking process upon receiving a selection of a corresponding steam cooking temperature range or steam cooking temperature. In other embodiments, the controller 2 may be configured and set up for starting a steam cooking process after receiving a particular and separate activation signal or input from the user interface 3. Starting of the steam cooking process may require that the controller 2 has received, prior to the activation signal, a particular steam temperature range setting or steam temperature setting and a selection of a steam cooking function or functionality.

An exemplary steam cooking process to be carried out by the controller 2 may be set up as follows:

If a user wants to perform a steam cooking process, then he may perform the following sequence of operational steps:

turn on the cooking oven, activate the steam cooking function, set a steam cooking temperature, as a primary cooking parameter, for carrying out the a steam cooking process with the oven cavity, and start the steam cooking process.

At the same time, the controller may perform the following steps:

receive an activation signal for turning on the cooking oven, receive an activation signal for the steam cooking function, receive a steam cooking temperature setting, as the primary cooking parameter, access by using the received steam cooking temperature the lookup table 7 and extract from the lookup table 7 a steam cooking humidity level, as the secondary operational parameter, assigned to the received steam temperature setting, set the extracted steam cooking humidity level as operational parameter, in particular secondary operational parameter, for operating the steam cooking process, and upon receiving a start signal from the user via the user interface, or in an automated manner, carry out the steam cooking process using at least the steam cooking temperature setting and extracted steam cooking humidity level as the primary and secondary operational parameters.

In embodiments, the controller 2, and a corresponding method, may be implemented and configured for allowing the user to set the steam cooking time period. For example, the controller 2 may be configured for receiving via the user interface 3 the time period from the user, and the controller 2 may set the duration of the steam cooking process in accordance with the received time period. After a lapse of time corresponding to the time period, the controller 2 may stop the steam cooking process.

As can be seen, the method for controlling the steam cooking process in accordance with the present invention, and a corresponding controller may be configured for automatically setting the humidity level of a steam cooking process on the basis of, i.e by using, a steam cooking temperature or temperature range that has been set by the user. This in particular may contribute to facilitating human-machine interaction with regard to setting up operational modes on steam cooking ovens, and/or may provide advantageous operational modes with steam cooking ovens with regard to user guidance while setting up steam cooking operational modes. In particular, the proposed method and controller enable users to set up steam cooking operational processes without requiring expert knowledge in steam cooking, meaning that operation of respective devices may be greatly facilitated.

The proposed method and controller may in embodiments also enable the user to set further or other cooking parameters. In addition, further or other cooking parameters may be taken into account for setting a suitable humidity level. For example, the steam cooking humidity level may be determined in addition to a selected steam cooking temperature or temperature range based on at least one of a set time period for the steam cooking process, and a selection of a food type or kind of food.

Figure 3:
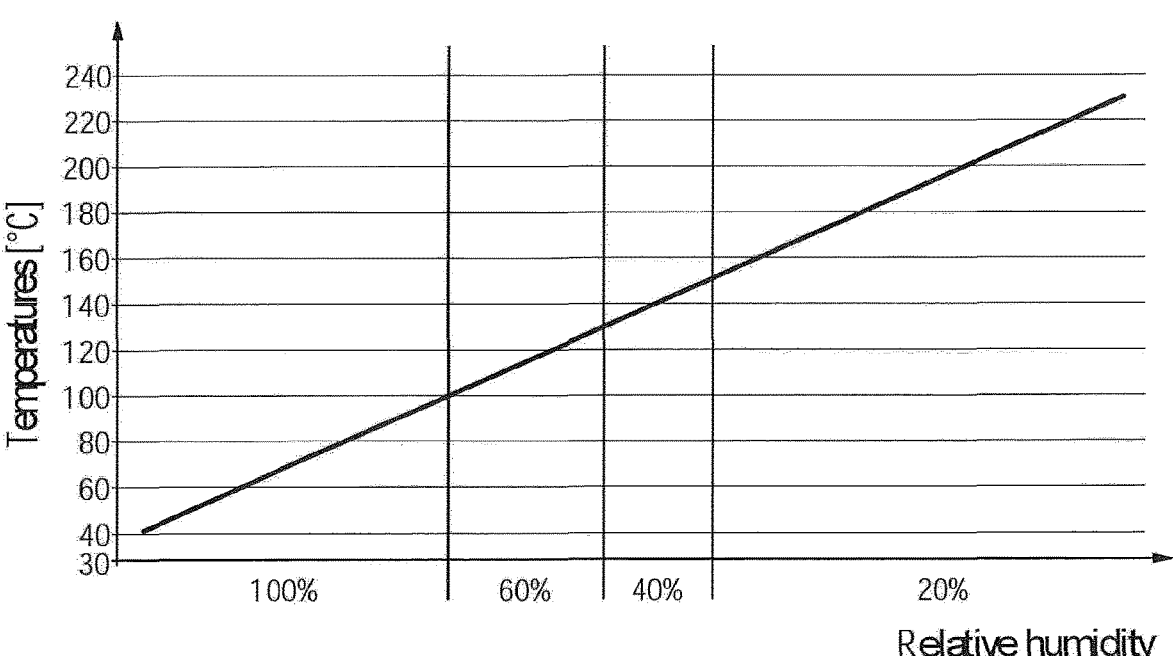
FIG. 3 illustrates an exemplary graph showing a mapping between steam cooking temperatures and humidity levels.

FIG. 3 illustrates an exemplary graph showing a mapping between steam cooking temperatures and humidity levels. In this graph, the ordinate axis depicts the steam cooking temperature, and the abscissa axis depicts the relative steam cooking humidity level. The line drawn in FIG. 3 illustrates a mapping between the steam cooking temperature and the steam cooking humidity level. The mapping in the present example is depicted as a linear graph, wherein it shall be noted that any other functional relationships between temperature and humidity level may be applied.

The relationship between temperature and humidity level may be stored in an electronic database, for example in form of a lookup-table, wherein the lookup table may include a mapping between the temperature or temperature ranges and a humidity level or ranges of humidity levels.

A corresponding and only illustrative lookup-table may provide a mapping for example according to the following scheme:

| primary cooking parameter: temperature | further/optional primary cooking parameter: cooking time | secondary operational parameter: humidity level |
|---|---|---|
| 40° C.-100° C. | 60 min-80 min | maximum humidity 100% |
| 100° C.-130° C. | 40 min-60 min | high humidity 60% |
| 130° C.-150° C. | 30 min-40 min | mid humidity 40% |
| 150° C.-230° C. | 25 min-30 min | low humidity 20% |

In such a lookup table further entries may be provided for combinations of several primary cooking parameters including a setting of the temperature and cooking time. Further, it is noted that a corresponding lookup-table may include a mapping involving only a pair of parameters, e.g. the temperature and the humidity level, meaning that the second column in the shown example may be omitted in variants of lookup tables.

Regarding FIG. 3, it is noted that the different regions defined by the vertical lines, for example between 100% and 60%, or between 60% and 40%, between 40% and 20%, or lower than 20%, may be representative for additional mappings between a primary cooking parameter to be set by the user and a secondary operational parameter to be automatically set by the cooking oven. For example, upon receiving as a primary cooking parameter a kind of food or type of dish, a corresponding lookup table may include mappings for setting operational parameters such as the temperature and humidity level. As an example the operational parameters including a humidity level of maximum humidity, i.e. 100%, and a temperature range 50°-100° C. may be mapped with dishes or foods like terrine, spoon desserts, steamed vegetables, poultry, fish, grains, and pulses. Further, operational parameters including a humidity level of up to 60% humidity, and a temperature range of 100°–130° C. may be mapped with fish, sweet bread, cheesecake, baked eggs, and reheating at low temperatures. Further, operational parameters including up to 40% humidity, and a temperature range of 135°–150° C. may be mapped with gratin fish, vegetables, pastry, such as lasagna, stewed meat, sweet casserole. Operational parameters including humidity levels up to 20%, and a temperature range of 155°-230° may be mapped with bread, roasted side dish, meat, poultry, fish, and bakery products.

As can be seen, a corresponding database may be adapted to enable a user to select different kinds or types of primary cooking parameters, such that correlated secondary operational parameters may be determined based on an input primary cooking parameter received from the user in accordance with a mapping provided in the database.

The user may select only one or more than one primary cooking parameters, and the cooking oven, e.g. a corresponding controller, may automatically determine only one or more than one secondary parameter. As an example, the user may input as the primary cooking parameter the cooking temperature, and the controller, based on the electronic database including respective mappings between the temperature setting and humidity level and/or cooking time, may set the cooking time and humidity level as the secondary cooking parameter(s).

As can be seen, the present invention in particular relates to a method of operating a cooking oven, comprising:

receiving a manual user setting for one or more than one primary cooking parameters; and, upon receipt of the one or more primary cooking parameters, executing an algorithm function for automatically and without further user input setting one or more than one additional secondary cooking parameters different from the received one or more primary cooking parameter the execution of the algorithm function comprising:

accessing an electronic database 4, 7, the electronic database 4, 7 including a mapping between the e primary and secondary cooking parameters; and automatically and without user input setting the secondary cooking parameters for controlling the cooking process.

The user control interface 10 shown in FIG. 1 may correspond to a two-dimensional lookup table 7 comprising correspondences between steam cooking temperature and humidity level. However, the lookup table 7 may be three-dimensional or even higher dimensional, for example in case that the lookup table 7 comprises correspondences between the humidity level and further parameters such as the time period and/or kind of food. Further, it shall be noted that the proposed method may involve several lookup tables each representative for a particular relationship between steam cooking process parameters.

In embodiments, the lookup table may comprise a correspondence between the humidity level and the steam cooking temperature and the steam cooking time period for the steam cooking process. Other parameters may be taken into account in the lookup table, or a corresponding database, for example the mass of the food and/or the kind of food, which may in embodiments be required to be entered by the user, wherein in other embodiments the cooking device or appliance may be configured to determine the mass of the food and/or the kind of food at least in part automatically, for example by the use of corresponding sensors, such as weighting units or camera units.

As already mentioned, the database, e.g. lookup table 7, may be implemented in hardware and/or software.

The method according to the present invention may be used for controlling an arbitrary steam cooking process, wherein the heat generators 5, fans, steam generators 6, microwave generator and/or further components of the steam cooking oven may be automatically adjusted and controlled on the basis of an initial steam cooking temperature or steam cooking temperature setting received from a user, wherein in optional operational modes, the steam cooking process may in addition be set up based on a steam cooking time period setting received by the user.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 1 operational system
2 controller
3 user interface
4 memory
5 heat generator
6 steam generator
7 lookup table
10 user control interface
12 first cooking temperature range
14 second cooking temperature range
16 third cooking temperature range
18 fourth cooking temperature range
20 first humidity amount
22 second humidity amount
24 third humidity amount
26 fourth humidity amount

The invention claimed is:

1. A computer-implemented method of setting cooking parameters for operating a cooking oven for performing a cooking process, comprising the steps of:
   receiving, at the cooking oven, one or more primary cooking parameters for cooking a food item with the cooking oven; and
   upon receipt of the one or more primary cooking parameters, executing an algorithm for automatically setting a plurality of secondary cooking parameters, the plurality of secondary cooking parameters being different from the received one or more primary cooking parameters, said plurality of secondary cooking parameters constituting additional operational settings for cooking the food item based on the received one or more primary cooking parameters;
   the execution of the algorithm comprising:
      accessing an electronic database that includes a mapping between the one or more primary cooking parameters and the plurality of secondary cooking parameters; and
      setting the plurality of secondary cooking parameters for controlling the cooking process based on the received one or more primary cooking parameters and the mapping, wherein
      the cooking process includes a first cooking phase and a second cooking phase, wherein at least one of the primary cooking parameters is associated with the first cooking phase and at least one of the plurality of secondary cooking parameters is associated with the second cooking phase.

2. The computer-implemented method according to claim 1, wherein the additional operational settings are for one or more heating elements, one or more fans, one or more humidifiers, one or more timers, or any combination thereof.

3. The computer-implemented method according to claim 1, further comprising adjusting a humidity level in accordance with a received primary cooking parameter.

4. The computer-implemented method according to claim 1, further comprising prompting, after receiving a primary cooking parameter, a second input from a user for an additional primary cooking parameter.

5. The computer-implemented method according to claim 1, the one or more primary cooking parameters being selected from among: a cooking temperature, a cooking temperature range, cooking time, and food-related cooking parameters.

6. The computer-implemented method according to claim 1, wherein the cooking process comprises a steam cooking process.

7. The computer-implemented method according to claim 6, further comprising setting a duration of the steam cooking process in accordance with a received primary cooking parameter, said received primary cooking parameter comprising a steam cooking time period.

8. The computer-implemented method according to claim 1, wherein the cooking process is selected from a plurality of available cooking processes.

9. The computer-implemented method according to claim 1, wherein the received one or more primary cooking parameters includes a food weight, a food volume, a food temperature, a food finishing, or any combination thereof.

10. The computer-implemented method according to claim 1, the received one or more primary cooking parameters include a predetermined cooking temperature range selected from a plurality of predetermined cooking temperature ranges, each of said plurality of predetermined cooking temperature ranges corresponding to a particular humidity level.

11. The computer-implemented method according to claim 10, wherein each of the plurality of predetermined cooking temperature ranges is assigned to a particular steam cooking process.

12. The computer-implemented method according to claim 11, wherein a first predetermined cooking temperature range from the plurality of predetermined cooking temperature ranges is assigned to the particular steam cooking process with a first predetermined humidity level.

13. A cooking method for performing an integrated cooking function of a food item using a cooking oven, the method comprising the steps of:
   receiving one or more primary cooking parameters for the integrated cooking function, wherein the received one or more primary cooking parameters includes a predetermined cooking temperature range selected from a plurality of predetermined cooking temperature ranges, each of said plurality of predetermined cooking temperature ranges corresponding to a particular humidity level;
   executing an algorithm that is configured to automatically set a plurality of secondary cooking parameters based on receipt of the one or more primary cooking parameters, the plurality of secondary cooking parameters being different parameter than the received one or more primary cooking parameters, the plurality of secondary cooking parameters constituting additional operational settings for cooking the food item based on the received one or more primary cooking parameters;
   said algorithm further configured to:
      access a database that includes a mapping between values of the received one or more primary cooking parameters and potential values of the plurality of secondary cooking parameters, select one of said potential values of the plurality of secondary cooking parameters that has been mapped to the received one or more primary cooking parameters, and operate the cooking oven based on the received one or more primary cooking parameters and the selected one of said potential value of the plurality of secondary cooking parameters.

14. The cooking method according to claim 13, the one or more primary cooking parameters being selected from among: a cooking temperature, a cooking temperature range, cooking time, and food-related cooking parameters.

15. The cooking method according to claim 13, wherein the additional operational settings are for one or more heating elements, one or more fans, one or more humidifiers, one or more timers, or any combination thereof.

16. The cooking method according to claim 13, further comprising adjusting a humidity level in accordance with a received primary cooking parameter.

17. The cooking method according to claim 13, further comprising prompting, after receiving a primary cooking parameter, a second input from a user for an additional primary cooking parameter.

18. The cooking method according to claim 13, wherein the integrated cooking function comprises a steam cooking process.

19. The cooking method according to claim 18, further comprising setting a duration of the steam cooking process in accordance with a received primary cooking parameter, said received primary cooking parameter comprising a steam cooking time period.

20. The cooking method according to claim 13, wherein the integrated cooking function is selected from a plurality of available integrated cooking functions.

21. The cooking method according to claim 13, wherein the received one or more primary cooking parameters includes a food weight, a food volume, a food temperature, a food finishing, or any combination thereof.

22. The cooking method according to claim 13, wherein each of the plurality of predetermined cooking temperature ranges is assigned to a particular steam cooking process.

23. The cooking method according to claim 22, wherein a first predetermined cooking temperature range from the plurality of predetermined cooking temperature ranges is assigned to the particular steam cooking process with a first predetermined humidity level.

* * * * *